US012122019B2

(12) United States Patent
Van Essen et al.

(10) Patent No.: US 12,122,019 B2
(45) Date of Patent: *Oct. 22, 2024

(54) TOOL BIT HAVING A BIMETAL TIP

(71) Applicant: MILWAUKEE ELECTRIC TOOL CORPORATION, Brookfield, WI (US)

(72) Inventors: James J. Van Essen, Hales Corners, WI (US); David Hlavac, Colgate, WI (US); Milorad Marich, Mequon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,746

(22) Filed: May 1, 2023

(65) Prior Publication Data

US 2023/0264325 A1 Aug. 24, 2023

Related U.S. Application Data

(63) Continuation of application No. 17/798,284, filed as application No. PCT/US2021/017549 on Feb. 11, 2021, now Pat. No. 11,673,239.

(Continued)

(51) Int. Cl.
*B25B 15/00* (2006.01)
*B25B 23/00* (2006.01)

(52) U.S. Cl.
CPC ........ *B25B 15/002* (2013.01); *B25B 23/0035* (2013.01)

(58) Field of Classification Search
CPC .......................... B25B 15/002; B25B 23/0035
See application file for complete search history.

(56) References Cited

U.S. PATENT DOCUMENTS 4,383,784 A 5/1983 Gulbrandsen
5,704,261 A 1/1998 Strauch et al.
(Continued)

FOREIGN PATENT DOCUMENTS

CN 201728399 U 2/2011
CN 201728404 U 2/2011
(Continued)

OTHER PUBLICATIONS

International Search Report and Written Opinion for Application No. PCT/US2021/017549 dated Jun. 3, 2021 (11 pages).
(Continued)

*Primary Examiner* — David B. Thomas
(74) *Attorney, Agent, or Firm* — Michael Best & Friedrich LLP

(57) ABSTRACT

A tool bit includes a drive portion configured to be selectively coupled to a tool and composed of a first material, a shank coupled to the drive portion ad being composed of the first material, and a working end portion configured to engage a fastener. The working end portion includes a first segment and a second segment. The first segment is coupled to the shank and composed of the first material. The second segment is fixed to the first segment at a connection interface and composed of a second material different than the first material. The second segment includes a first portion and a second portion. Solely the second portion engages the fastener when the tool bit drives the fastener.

20 Claims, 4 Drawing Sheets

Related U.S. Application Data

(60) Provisional application No. 62/975,787, filed on Feb. 13, 2020.

(56) References Cited

U.S. PATENT DOCUMENTS

| | | | |
|---|---|---|---|
| 5,953,969 | A | 9/1999 | Rosenhan |
| 6,065,908 | A | 5/2000 | Kleine et al. |
| 7,168,348 | B2 | 1/2007 | Holland-Letz |
| D646,547 | S | 10/2011 | DeBaker |
| D662,802 | S | 7/2012 | DeBaker |
| D663,187 | S | 7/2012 | DeBaker |
| 8,418,587 | B2 | 4/2013 | DeBaker |
| 8,777,527 | B2 | 7/2014 | Glaser et al. |
| D711,719 | S | 8/2014 | DeBaker |
| 8,800,407 | B2 | 8/2014 | DeBaker |
| 8,806,982 | B2 | 8/2014 | Bohn et al. |
| D734,792 | S | 7/2015 | Santamarina et al. |
| D737,875 | S | 9/2015 | Santamarina et al. |
| 9,156,094 | B2 | 10/2015 | Durfee et al. |
| 9,333,564 | B2 | 5/2016 | Santamarina et al. |
| 9,849,570 | B2 | 12/2017 | DeBaker |
| 9,943,934 | B2 | 4/2018 | Eggert |
| 10,022,845 | B2 | 7/2018 | Neitzell |
| 10,065,294 | B2 | 9/2018 | DeBaker |
| 10,427,278 | B2 | 10/2019 | Su |
| 10,434,611 | B2 | 10/2019 | Eggert |
| 11,638,987 | B2 * | 5/2023 | Van Essen .......... C22C 33/0292 81/436 |
| 11,673,239 | B2 * | 6/2023 | Van Essen ............ B25B 15/001 81/438 |
| 2002/0129680 | A1 | 9/2002 | Holland-Letz |
| 2004/0099106 | A1 | 5/2004 | Strauch et al. |
| 2004/0139829 | A1 | 7/2004 | Holland-Letz |
| 2005/0076749 | A1 | 4/2005 | Liu |
| 2008/0166194 | A1 | 7/2008 | Durfee |
| 2010/0003094 | A1 | 1/2010 | Durfee |
| 2011/0013999 | A1 | 1/2011 | Moseley et al. |
| 2014/0328640 | A1 | 11/2014 | Santamarina et al. |
| 2015/0196995 | A1 | 7/2015 | Neitzell |
| 2018/0117793 | A1 | 5/2018 | Wang |
| 2018/0311798 | A1 | 11/2018 | Neitzell |
| 2018/0326563 | A1 | 11/2018 | DeBaker |

FOREIGN PATENT DOCUMENTS

| | | | |
|---|---|---|---|
| CN | 102974871 | A | 3/2013 |
| CN | 203030990 | U | 7/2013 |
| CN | 204209187 | U | 3/2015 |
| CN | 106956049 | A | 7/2017 |
| CN | 206373406 | U | 8/2017 |
| CN | 108118331 | A | 6/2018 |
| DE | 102007041574 | A1 | 3/2009 |
| DE | 10362089 | B4 | 12/2009 |
| EP | 0100376 | A2 | 2/1984 |
| EP | 2018919 | A1 | 1/2009 |
| EP | 2835201 | A1 | 2/2015 |
| EP | 3385014 | A1 | 10/2018 |
| JP | 2005319523 | A | 11/2005 |
| WO | 2012049079 | A1 | 4/2012 |
| WO | 2017009413 | A1 | 1/2017 |
| WO | 2019109098 | A1 | 6/2019 |

OTHER PUBLICATIONS

International Preliminary Report on Patentability for Application No. PCT/US2021/017549 dated Nov. 24, 2021 (15 pages).

* cited by examiner

TOOL BIT HAVING A BIMETAL TIP

CROSS-REFERENCE TO RELATED APPLICATIONS

The present application is a continuation of U.S. patent application Ser. No. 17/798,284, filed Aug. 8, 2022, now U.S. Pat. No. 11,673,239, which is a national stage filing under 35 U.S.C. § 371 of International Application No. PCT/US2021/017549 filed on Feb. 11, 2021, which claims priority to U.S. Provisional Patent Application No. 62/975,787 filed Feb. 13, 2020, the contents of all of which are incorporated herein by reference.

FIELD OF THE DISCLOSURE

The present disclosure relates to tool bits and, more particularly, to tool bits being composed of multiple materials.

SUMMARY

In one aspect, a tool bit includes a drive portion configured to be selectively coupled to a tool. The drive portion is composed of a first material. The tool bit also includes a shank coupled to the drive portion. The shank is composed of the first material. The tool bit includes a working end portion having a first segment and a second segment. The first segment is coupled to the shank and being composed of the first material. The second segment is fixed to the first segment at a connection interface. The second segment is composed of a second material different than the first material. The second segment is configured to engage a fastener for the working end portion to drive the fastener.

In another aspect, a tool bit includes a drive portion configured to be selectively coupled to a tool. The drive portion is composed of a first material. The tool bit includes a working end portion having a shape configured to correspond with a recess of a fastener for the working end portion to engage and drive the fastener. The working end portion includes a first segment and a second segment. The first segment is located between the second segment and the drive portion. The first segment is composed of the first material. The second segment is fixed to the first segment at a connection interface. The second segment is composed of a second material different than the first material.

In yet another aspect, a method of manufacturing a tool bit includes providing a first stock of material composed of a first material, providing a second stock of material composed of a second material different than the first material, fixing the first stock of material and the second stock of material together to form a connection interface, determining a length of the second stock of material extending from the connection interface, shaping the first stock of material to form a first segment of a working end portion, and shaping the second stock of material based on the determined length to form a second segment of the working end portion. The second segment is configured to engage a fastener for the working end portion to drive the fastener.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
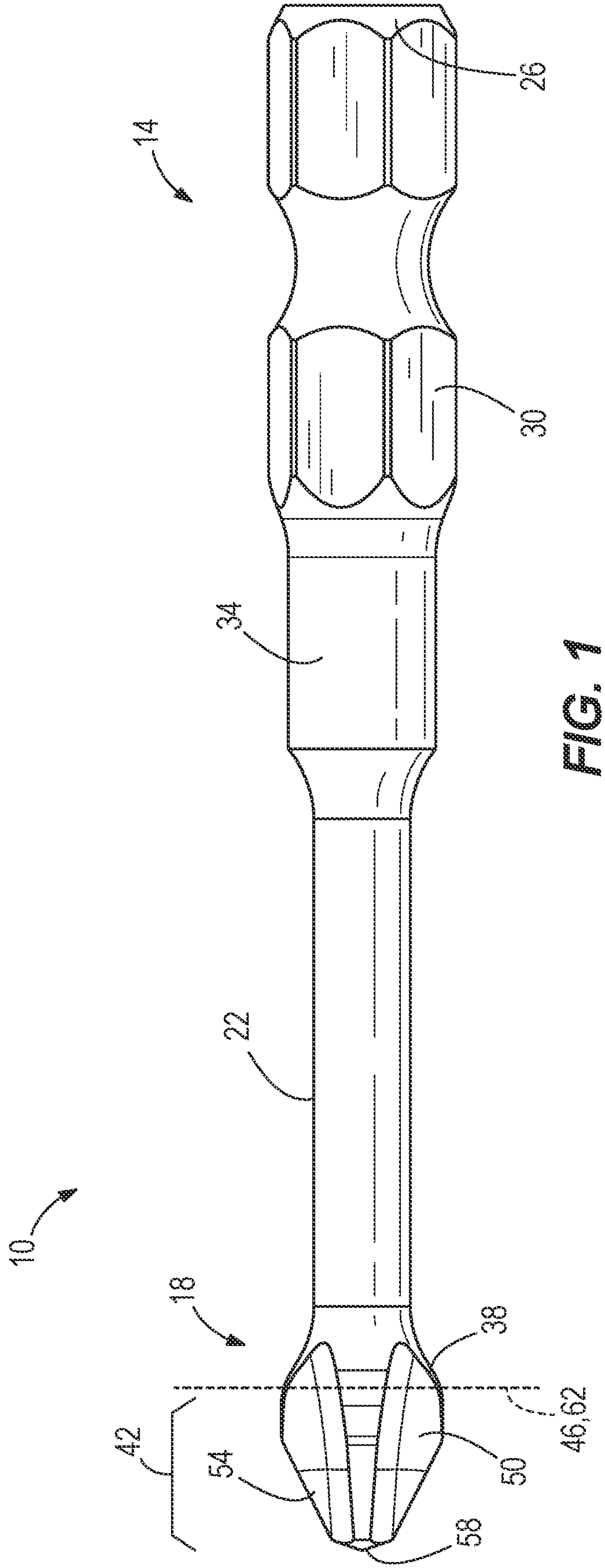
FIG. 1 is a side view of a tool bit according to an embodiment of the disclosure.
Figure 2:
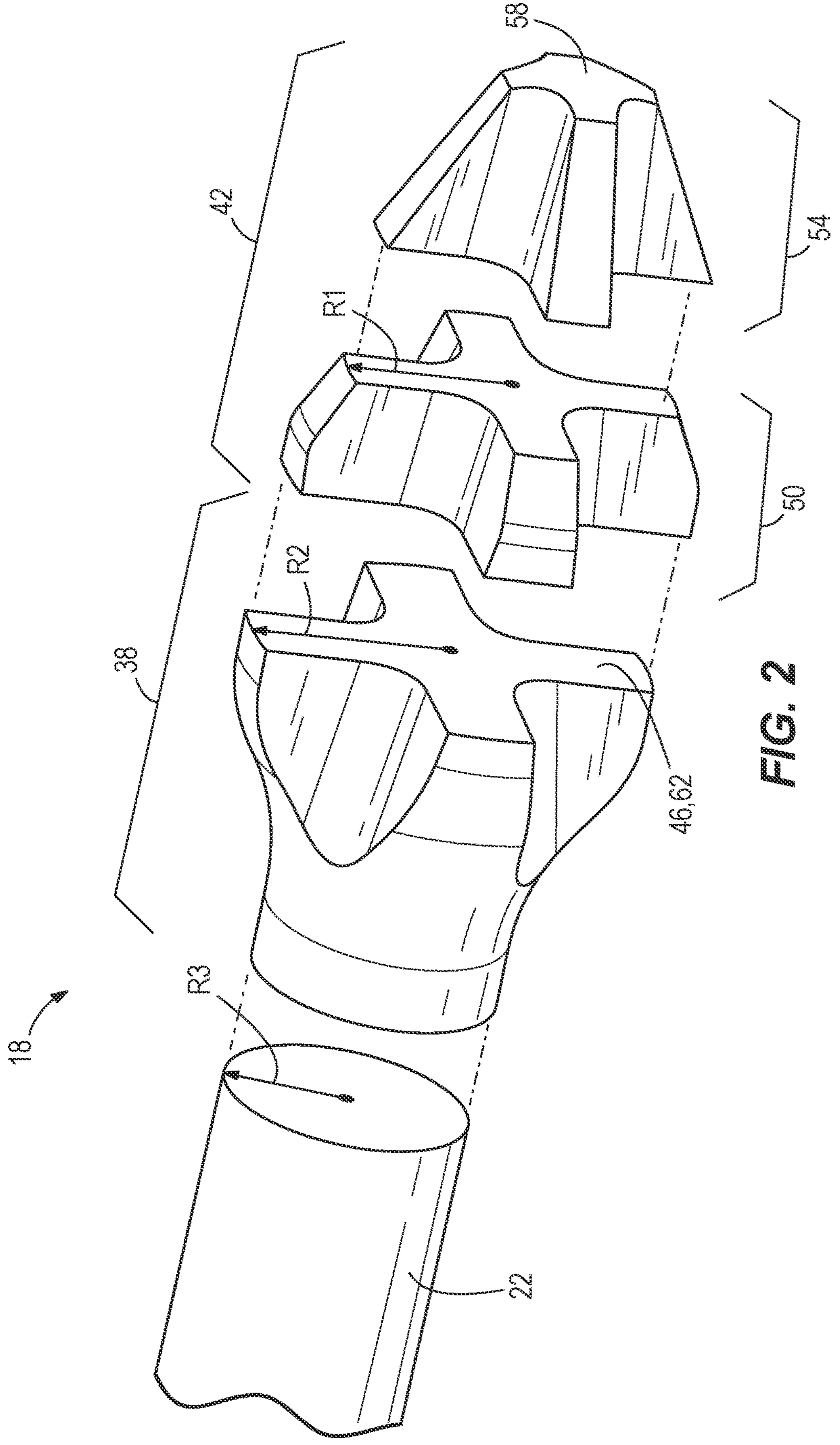
FIG. 2 is an exploded side view of a portion of the tool bit of FIG. 1.

FIGS. 1 and 2 illustrate a tool bit 10 for use with a tool (e.g., a power tool and/or a hand tool). The illustrated tool bit 10 includes a tool body having an insertion end portion 14 (e.g., a hexagonal drive portion), a working end portion 18, and a connection portion 22 (e.g., a shank) extending between the working end portion 18 and the insertion end portion 14.

The insertion end portion 14 is configured to be connected to the tool. More particularly, the insertion end portion 14 is configured to be inserted into and received by a bit holder, chuck, or other structure coupled to or part of the tool. For ease of discussion, all of these types of structures will be referred to as bit holders herein. The insertion end portion 14 defines a first end 26 of the tool body that is opposite the working end portion 18. The insertion end portion 14 is composed of a first material. An outer surface on the insertion end portion 14 is at least partially defined by a non-circular profile 30. In the illustrated embodiment, the non-circular profile 30 is a hexagonal or hex-shaped profile configured to be received in a hexagonal or hex-shaped bit holder. In other embodiments, the non-circular profile 30 may be other suitable profiles, such as D-shaped, flattened, oblong, triangular, square, octagonal, star-shaped, irregular, and the like. A portion of the outer surface on the insertion end portion 14 not defined by the non-circular profile 30 is defined by a circular profile 34. In other embodiments, the circular profile 34 may be another profile, such as square, octagonal, star-shaped, irregular, and the like, or the circular profile 34 may be omitted. The circular profile 34 is proximate the connection portion 22.

The connection portion 22 is positioned between the working end portion 18 and the insertion end portion 14 (e.g., between the working end portion 18 and the circular profile 34). The connection portion 22 includes a circular cross-sectional shape and defines a maximum radial dimension R3 (e.g., a maximum radius; FIG. 2) relative to a longitudinal axis of the tool bit 10. In additional embodiments, the connection portion 22 may define a cross-sectional shape that is rectangular, octagonal, star-shaped, and the like. The connection portion 22 is also composed of the first material.

The working end portion 18 is configured to engage with a fastener (e.g., a screw). More particularly, the working end portion 18 is configured to drive the fastener into a workpiece. With reference to FIGS. 1 and 2, the working end portion 18 includes a first segment 38 (e.g., a rearward segment) separated from a second segment 42 (e.g., a forward segment) by a connection interface 46. As shown in FIG. 2, the connection interface 46 defines a maximum radial dimension R2 (e.g., a maximum radius) relative to the longitudinal axis of the tool bit 10. A cross-section of the working end portion 18 at the maximum radius R2 defines a cross. As such, the maximum radius R2 is measured relative to a circle circumscribed by the cross. In additional embodiments, the cross-section may define a rectangle, an oval, a star, and the like.

With continued reference to FIGS. 1 and 2, the illustrated forward segment 42 is composed of a second material and includes a first portion 50 and a second portion 54. The second portion 54 includes a second end 58 (e.g., a tip) of the tool body that is opposite the first end 26. The second portion 54 of the working end portion 18 is the portion of the tool bit 10 that is inserted into a recess of the fastener when the tool bit 10 engages and drives the fastener. As such, the second portion 54 can be referenced as a fastener engagement portion. In particular, the working end portion 18 is inserted into the fastener up to a depth measured from the second end 58 (e.g., the axial distance between the second end 58 and the interface between the first and second portions 50, 54). At this depth (e.g., a location at which fastener engagement ceases), an outer surface of the working end portion 18 defines a maximum radial dimension R1 (e.g., a maximum radius; FIG. 2) relative to the longitudinal axis of the tool bit 10. In the depicted embodiment, a cross-section of the working end portion 18 at the maximum radius R1 also defines a cross. As such, the maximum radius R1 is measured relative to a circle circumscribed by the cross. In additional embodiments, the cross-section may define a rectangle, an oval, a star, and the like. In the depicted embodiment, the radius R2 is larger than the radius R1. Additionally, the radius R1 and the radius R2 are both larger than the radius R3. Furthermore, a distance from the second end 58 to the location of the maximum radius R1 is less than a distance from the second end 58 to the location of the connection interface 46.

In the illustrated embodiment, the working end portion 18 is composed of the first material and the second material. The second material defines the second segment 42 (e.g., the first and second portions 50, 54), and the first material defines a remainder of the working end portion 18 (e.g., the first segment 38) not defined by the second material. In the depicted embodiment, the second material has a hardness that is greater than a hardness of the first material. In other words, the second segment 42 is harder than the first segment 38. In some embodiments, the hardness of the second material is at least 5% greater than the hardness of the first material. In other embodiments, the hardness of the second material is between 5% and 30% greater than the hardness of the first material.

In the depicted embodiment, the first material is a tool steel. In some embodiments, the first material may be a low carbon steel, such as AISI 1018. AISI 1018 low carbon steel includes a balance of toughness, strength, and ductility. AISI 1018 low carbon steel includes approximately 0.14% to 0.2% carbon and 0.6% to 0.9% manganese. In other embodiments, the first material may be a high carbon steel, such as AISI 1065. AISI 1065 high carbon steel includes a high tensile strength. AISI high carbon steel includes approximately 0.6% to 0.7% carbon and 0.6% to 0.9% manganese. In additional embodiments, the first material may be an alternative material. The tool steel may have a hardness, for example between about 45 HRC and about 60 HRC. In some embodiments, the tool steel may have a hardness of between about 45 HRC and about 55 HRC.

In the depicted embodiment, the second material is a high speed steel (HSS), such as PM M4. PM M4 high speed steel includes a fine grain size, small carbides, and a high steel cleanliness, which together provide high wear-resistance, high impact toughness, and high bend strength. PM M4 high speed steel includes approximately 1.4% carbon, 4% Chromium, 5.65% tungsten, 5.2% molybdenum, and 4% vanadium. In additional embodiments, the second material may be an alternative material (e.g., carbide). The high speed steel may have a hardness, for example, of 60 HRC or greater.

By using the high or low carbon steel as the first material and the PM M4 high speed steel as the second material, the cost to manufacture the tool bit 10 is minimized while the strength of the tool bit 10 is maintained. The cost to manufacture the tool bit 10 is minimized due to the material being used for the first material generally being inexpensive. The second material compensates for a lower strength of the first material.

Figure 3:
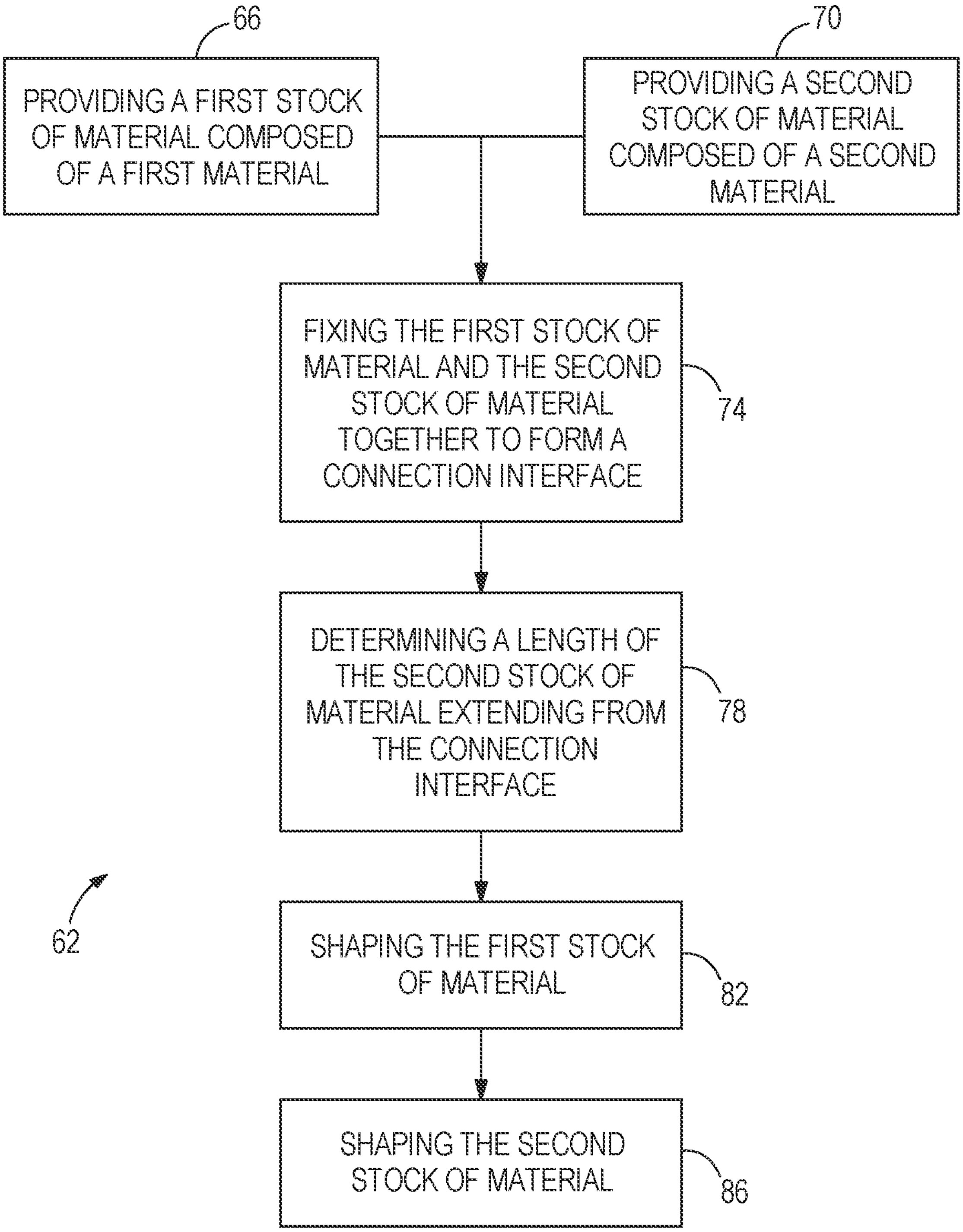
FIG. 3 is a flowchart illustrating a method of manufacturing the tool bit of FIG. 1.

FIG. 3 illustrates a method 62 of manufacturing the tool bit 10. Although the illustrated method 62 includes specific steps, not all of the steps need to be performed. In addition, the depicted steps do not need to be performed in the order presented. The method 62 may also include additional or alternative steps.

The illustrated method 62 includes providing a first stock of material (step 66) composed of the first material and providing a second stock of material (step 70) composed of the second material. Step 74 includes fixing the first stock of material to the second stock of material (e.g., the forward segment 42 composed of the second material is secured to the rearward segment 38 composed of the first material). The segments 38, 42 are fixed together at the connection interface 46. In the illustrated embodiment, the segments 38, 42 are fixed together by a welding process. The first and second stocks of material may be welded via spin welding, resistance welding, laser welding, friction welding, and the like. In other embodiments, the segments 38, 42 are fixed together by a different process (e.g., a brazing process or the like). In the depicted embodiment, the first stock of material is a hex-shaped blank and the second stock of material is a cylinder-shaped blank. In additional embodiments, the first and second stocks of material may differ in shape.

An axial length of the second stock of material extending from the connection interface 46 is determined (step 78) as discussed in more detail below. The first stock of material and the second stock of material may then be machined or shaped (steps 82, 86) to form the tool bit 10. Shaping the second stock of material (step 86) is based on the determined length (step 78) of the second stock of material. The first stock of material forms the first end 26 to the connection interface 46, and the second stock of material forms the second end 58 to the connection interface 46. In other words, the first stock of material is shaped to form the insertion end portion 14, the connection portion 22, and the rearward portion 38. The second stock of material is shaped to form the working end portion 18 from the second end 58 to the connection interface 46 (e.g., the forward segment 42). In other embodiments, the method 62 can be different (e.g., the axial length of the second stock can be determined before the first and second stock of material are fixed together).

To determine a location of the connection interface 46 (step 78), the torsional stress $\tau_{R1}$ is calculated at the radius R1. The torsional stress $\tau_{R1}$ is related to an applied torque $T_{R1}$, the radius R1 that the stress is occurring at, and a polar moment of inertia of the cross section $J_{T_{R1}}$ at the radius R1. The torsional stress $\tau_{R1}$ at the radius R1 is expressed in Equation 1.

$$\tau_{R1} = \frac{T_{R1} * R1}{J_{T_{R1}}} \quad \text{(Eqn. 1)}$$

The torsional stress $\tau_{R2}$ allowed at the radius R2 may then be calculated based on the torsional stress $\tau_{R1}$ at the radius R1. The torsional stress $\tau_{R2}$ allowed at the radius R2 is a percentage P of the torsional stress $\tau_{R1}$ at the radius R1. The percentage P is based on the difference in hardness between the first material and the second material. For example, if the first material was 80% the hardness of the second material, the torsional stress $\tau_{R2}$ allowed at the radius R2 would be 80% the torsional stress $\tau_{R1}$ at the radius R1. The torsional stress $\tau_{R2}$ allowed at the radius R2 is expressed in Equation 2.

$$\tau_{R2} = P * \frac{T_{R1} * R1}{J_{T_{R1}}} \quad \text{(Eqn. 2)}$$

In addition to the torsional stress $\tau_{R2}$ allowed at the radius R2 being expressed in Equation 2, the torsional stress $\tau_{R2}$ allowed at the radius R2 may be related to the applied torque $T_{R2}$, the radius R2, and a polar moment of inertia of the cross section $J_{T_{R2}}$ at the radius R2. The torsional stress $\tau_{R2}$ allowed at the radius R2 is expressed in Equation 3.

$$\tau_{R2} = \frac{T_{R2} * R2}{J_{T_{R2}}} \quad \text{(Eqn. 3)}$$

Equation 2 may be equated to Equation 3. Since the applied torque is the same through the drill bit, the torque $T_{R1}$ at the radius R1 is the same as the torque $T_{R2}$ at the radius R2. This expression is shown in Equation 4.

$$P * \frac{R1}{J_{T_{R1}}} = \frac{R2}{J_{T_{R2}}} \quad \text{(Eqn. 4)}$$

The connection interface 46 may be selected such that the ratio of the radius R2 to the polar moment of the cross section $J_{T_{R2}}$ at the radius R2 is less than or equal to the ratio of the radius R1 to the polar moment of the cross section $J_{T_{R1}}$ at the radius R1 multiplied by the percentage P difference between the hardnesses of the first material and the second material.

In some embodiments, the tool bit 10 may have a reduced diameter portion (e.g., the illustrated connection portion 22) that allows the tool bit 10 to twist along its length. If the tool bit 10 includes this type of reduced diameter portion, the allowed torsional stress at the radius R2 is calculated to account for the reduced diameter portion. The radius R3 is located within the reduced diameter portion. The allowed torsional stress at the radius R2 is illustrated in Equation 5, which is similar to Equation 4.

$$P * \frac{R3}{J_{T_{R3}}} = \frac{R2}{J_{T_{R2}}} \quad \text{(Eqn. 5)}$$

The connection interface 46 may be selected in view of both Equation 5 and Equation 4. In other words, the ratio of the radius R2 to the polar moment of the cross section $J_{T_{R2}}$ at the radius R2 is additionally less than or equal to the ratio of the radius R3 to the polar moment of the cross section $J_{T_{R3}}$ at the radius R3 multiplied by the percentage P difference between the hardnesses of the first material and the second material.

Figure 4:
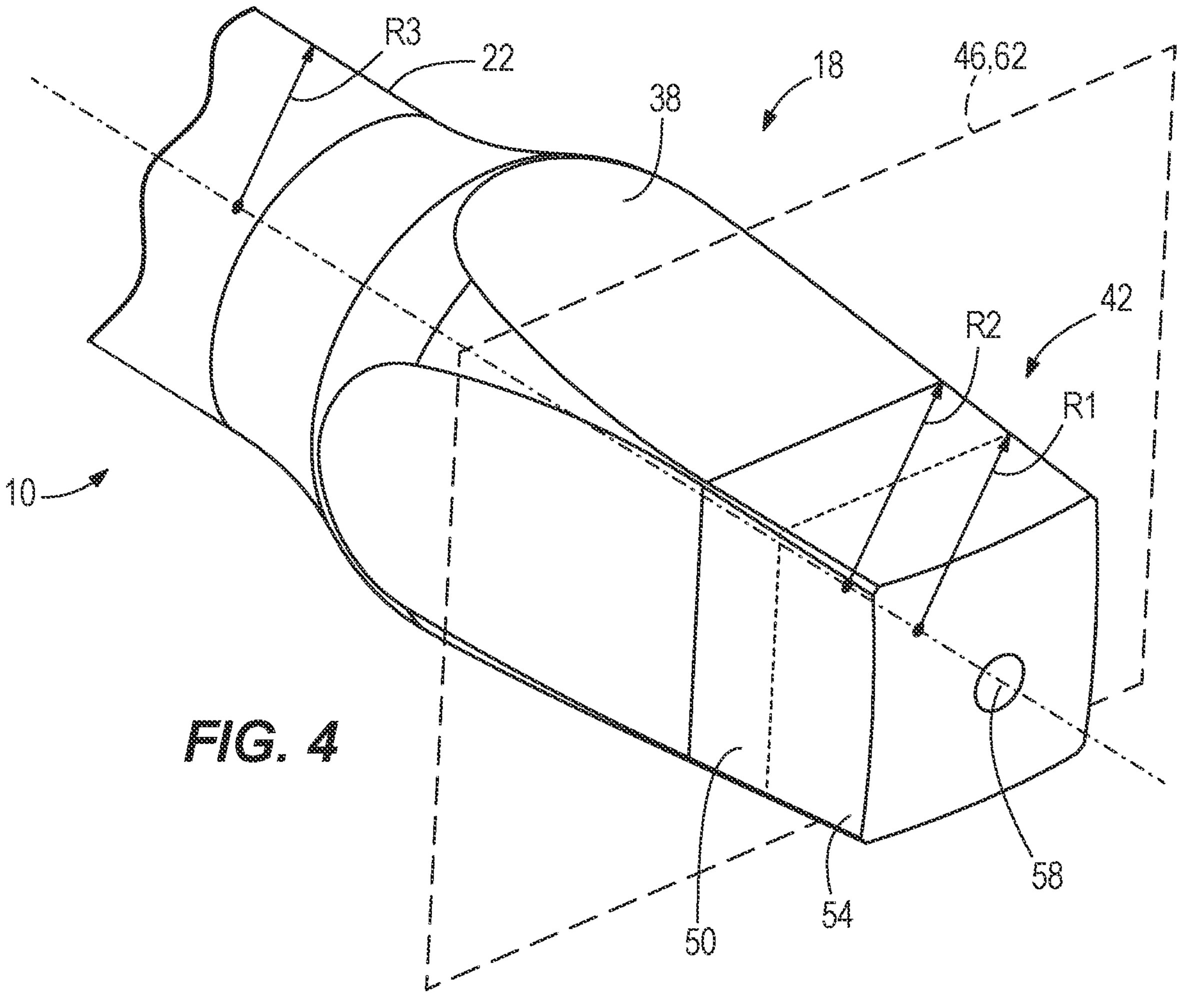
FIG. 4 is a perspective view of a portion of a tool bit according to another embodiment of the disclosure.

An axial distance of the connection interface 46 from the second end 58 may be determined (step 78) based on the ratio of the radius R2 to the polar moment of the cross section $J_{T_{R2}}$ at the radius R2. In other words, a radius and a polar moment may be calculated along a length of the working end portion 18 to determine where the correct ratio occurs. For example, the axial distance of the connection interface 46 of a square tip tool bit 10 (e.g., size #2 square bit; FIG. 4) is based on the ratio of the radius R2 to the polar moment of the cross section $J_{T_{R2}}$ at the radius R2, as depicted in the table below. In this example, the hardness of the first material is 80% of the hardness of the second material, and the engagement distance (i.e., the location of the maximum radius R1) is about 0.08 inches from the second end 58. As such, the ratio of the radius R1 to the polar moment of the cross section $J_{T_{R1}}$ at the radius R1 is 2614.5. Using Equation 4 above, 80% of 2614.5 is 2091.6, which is the target ratio for R2. Based on the table below, the calculated ratio for radius R2 to the polar moment of the cross section $J_{T_{R2}}$ at the radius R2 is equal to or less than 2091.6 when the distance from the second end 58 is 0.16 inches. As such, the connection interface 46 between the first material and the second material for a size #2 square bit should be at about 0.16 inches from the second end 58.

| Distance from the second end (inches) | Polar Moment of Inertia of the cross section | Radius (inches) | $\frac{R2}{J_{T_{R2}}}$ |
|---|---|---|---|
| 0.08 | 0.00003117 | 0.081496 | 2614.567 |
| 0.1 | 0.00003328 | 0.083071 | 2496.12 |
| 0.12 | 0.00003608 | 0.084646 | 2346.055 |
| 0.14 | 0.00004029 | 0.08622 | 2139.997 |
| 0.16 | 0.00004613 | 0.087795 | 1903.214 |

Determining the axial distance of the connection interface 46 of the #2 square bit, as described above, can be applied to different sizes and/or types of bits 10. The table below provides some examples of different sizes and types of bits 10 and maintains that the hardness of the first material is 80% of the hardness of the second material. Specifically, the first column in the table below represents the type and size of the bit 10 (e.g., PH1 is a size #1 Phillips-head bit, PZ1 is a size #1 Pozidriv-head bit, SQ1 is a size #1 square-head bit, and T10 is a size #10 Torx-head bit). In other words, the number associated with the type/geometry of the bit represents the standard size of the bit head. The table below shows, for example, the axial distance of the connection interface 46 of a size #1 Phillips-head bit relative to the tip 58 is about 0.087 inches. Specifically, a typical axial distance between the tip 58 and the radius R1 (e.g., a depth at which a #1 Phillips-head bit is received within a fastener) is about 0.075 inches. At that axial length, the polar moment of the cross section $J_{T_{R1}}$ at radius R1 is 0.00000840 and radius R1 is 0.058544 inches, such that a ratio of the radius R1 to the polar moment of the cross section $J_{T_{R1}}$ at the radius R1 is 6969.524. Taking in account for the differential between the hardnesses of the first and second materials, 80% of 6969.524 is about 5575.62, which is the target ratio for R2. As shown in the table below, the calculated ratio for radius R2 to the polar moment of the cross section $J_{T_{R2}}$ at the radius R2 is equal to or less than 5575.62 when the distance from the second end 58 is about 0.087 inches. As such, the connection interface 46 between the first material and the second material for a size #1 Phillips-head bit should be at about 0.087 inches from the second end 58. Similar calculations can be performed for the other types of tool bits 10 within the table below.

| Tip Type | Distance between the radius R1 and the second end (inches) | Distance between the connection interface and the second end (inches) | Polar Moment of Inertia of the cross section | Radius (inches) | $\frac{R2}{J_{T_{R2}}}$ |
|---|---|---|---|---|---|
| PH1 | 0.075 | — | 0.00000840 | 0.058544 | 6969.524 |
| | — | 0.087 | 0.00001190 | 0.063900 | 5369.748 |
| PH2 | 0.118 | | 0.00004889 | 0.097677 | 1997.897 |
| | — | 0.138 | 0.00007068 | 0.107480 | 1520.661 |
| PH3 | 0.135 | — | 0.00011500 | 0.118110 | 1027.043 |
| | — | 0.205 | 0.00014610 | 0.118110 | 808.419 |
| PZ1 | 0.07 | — | 0.00000729 | 0.057489 | 7886.008 |
| | — | 0.083 | 0.00000990 | 0.062500 | 6313.131 |
| PZ2 | 0.13 | — | 0.00006320 | 0.104194 | 1648.639 |
| | — | 0.16 | 0.00008610 | 0.113870 | 1322.532 |
| PZ3 | 0.15 | — | 0.00012400 | 0.118110 | 952.500 |
| | — | 0.25 | 0.00016247 | 0.118110 | 726.965 |
| SQ1 | 0.08 | — | 0.00001498 | 0.066487 | 4438.385 |
| | — | 0.13 | 0.00001984 | 0.069000 | 3477.823 |
| SQ3 | 0.09 | — | 0.00005847 | 0.095134 | 1627.057 |
| | — | 0.16 | 0.00007818 | 0.099180 | 1268.611 |
| T10 | 0.07 | — | 0.00000702 | 0.053357 | 7600.712 |
| | — | 0.12 | 0.00000922 | 0.055970 | 6070.499 |
| T25 | 0.1 | — | 0.00004716 | 0.086691 | 1838.232 |
| | — | 0.16 | 0.00006120 | 0.089000 | 1454.248 |
| T30 | 0.12 | — | 0.00011100 | 0.108388 | 976.468 |
| | — | 0.19 | 0.00014840 | 0.113250 | 763.140 |
| T40 | 0.13 | — | 0.00024560 | 0.130452 | 531.156 |
| | — | 0.212 | 0.00032340 | 0.136861 | 423.194 |

In other types of tool bits 10, a T15 bit includes a distance between the connection interface 46 and the tip 58 of about 0.12 inches with a fastener engagement depth of about 0.07 inches, a T25 bit includes a distance between the connection interface 46 and the tip 58 of about 0.16 inches with a fastener engagement depth of about 0.1 inches, and a T27 bit includes a distance between the connection interface 46 and the tip 58 of about 0.175 inches with a fastener engagement depth of about 0.11 inches.

Figure 5:
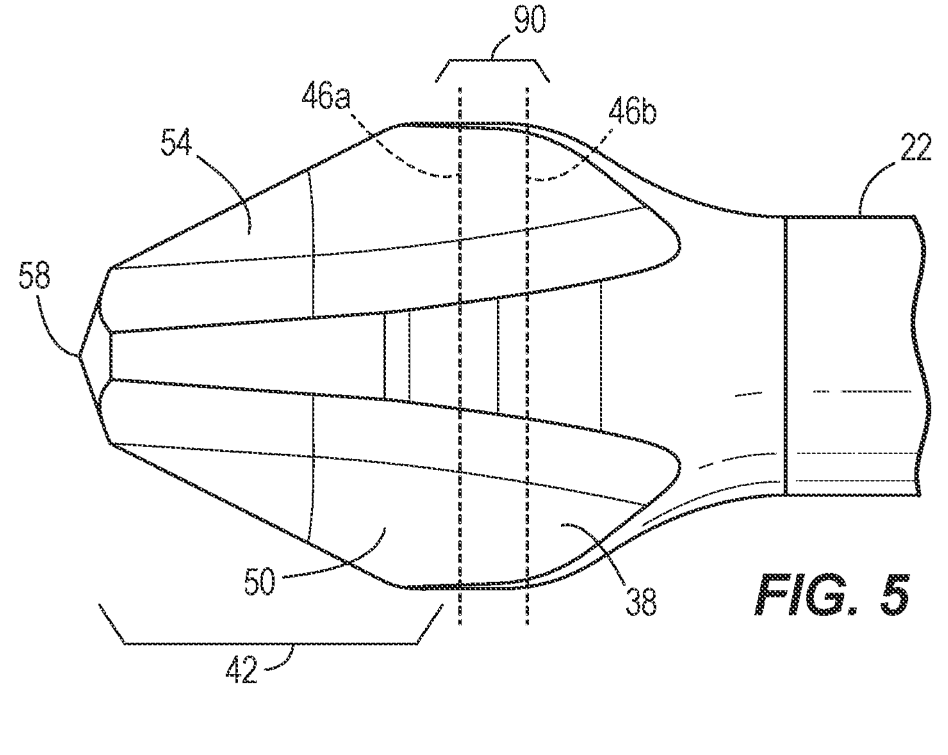
FIG. 5 is a side view of a portion of the tool bit of FIG. 1 illustrating a weld zone of the tool bit.

With reference to FIG. 5, welding the first material to the second material may create a heat affect zone 90. The heat affect zone 90 has a lower material strength than a material strength of the second material. A distance at which the heat affect zone 90 has affected the second material is added to the axial distance of the original connection interface 46*a* to offset a desired connection interface 46*b* an additional amount. For example, if the heat affect zone 90 is 0.11 inches and the initially calculated axial distance of the connection interface 46*a* is 0.16 inches from the second end 58, a revised connection interface 46*b* to account for the heat affect zone 90 would be 0.27 inches from the second end 58.

In some scenarios, the tool bit 10 may be stress relieved or heat treated after the first material is welded to the second material. In such scenarios, the heat affect zone 90 may be neglected, and an offset for the connection interface 46 would not need to be calculated.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A tool bit comprising:

a drive portion configured to be selectively coupled to a tool, the drive portion being composed of a first material;

a shank coupled to the drive portion, the shank being composed of the first material, the shank defining a first maximum outer dimension; and a working end portion configured to engage a fastener, the working end portion including a first segment and a second segment, the first segment coupled to the shank and being composed of the first material, the second segment fixed to the first segment at a connection interface, the second segment being composed of a second material different than the first material, the second segment including a first portion and a second portion, wherein solely the second portion engages the fastener when the tool bit drives the fastener, wherein the connection interface defines a second maximum outer dimension, wherein the first portion defines a third maximum outer dimension at an interface with the second portion, wherein the second maximum outer dimension is larger than the third maximum outer dimension, and wherein the third maximum outer dimension is larger than the first maximum outer dimension.

2. The tool bit of claim 1, wherein the first maximum outer dimension is a first maximum radius.

3. The tool bit of claim 1, wherein the second maximum outer dimension is a second maximum radius, and wherein the third maximum outer dimension is a third maximum radius.

4. The tool bit of claim 1, wherein a ratio of the second maximum outer dimension to a polar moment of a cross section at the second maximum outer dimension is less than or equal to a ratio of the third maximum outer dimension to a polar moment of a cross section at the third maximum outer dimension multiplied by a percentage difference between a hardness of the first material and a hardness of the second material.

5. The tool bit of claim 1, wherein the shank includes a reduced diameter portion that allows the tool bit to twist along a length of the tool bit, and wherein the first maximum outer dimension is located at the reduced diameter portion.

6. The tool bit of claim 5, wherein a ratio of the second maximum outer dimension to a polar moment of a cross section at the second maximum outer dimension is less than or equal to a ratio of the first maximum outer dimension to a polar moment of a cross section at the first maximum outer dimension multiplied by a percentage difference between a hardness of the first material and a hardness of the second material.

7. The tool bit of claim 1, wherein the second material has a hardness greater than a hardness of the first material.

8. The tool bit of claim 1, wherein the second segment is welded to the first segment at the connection interface.

9. A tool bit comprising:

a drive portion configured to be selectively coupled to a tool, the drive portion being composed of a first material; and a working end portion including a shape configured to correspond with a recess of a fastener for the working end portion to engage and drive the fastener, the working end portion including a first segment and a second segment, the first segment located between the second segment and the drive portion, the first segment composed of the first material, the second segment fixed to the first segment at a connection interface, the second segment being composed of a second material different than the first material, the second segment including a first portion and a second portion, wherein solely the second portion engages the fastener when the tool bit drives the fastener, wherein the first portion defines a first maximum outer dimension at an interface with the second portion, wherein the connection interface defines a second maximum outer dimension, and wherein the second maximum outer dimension is larger than the first maximum outer dimension.

10. The tool bit of claim 9, wherein a ratio of the second maximum outer dimension to a polar moment of a cross section at the second maximum outer dimension is less than or equal to a ratio of the maximum outer dimension to a polar moment of a cross section at the first maximum outer dimension multiplied by a percentage difference between a hardness of the first material and a hardness of the second material.

11. The tool bit of claim 9, further comprising a shank extending between the drive portion and the working end portion, wherein the shank defines a third maximum outer dimension.

12. The tool bit of claim 11, wherein a ratio of the second maximum outer dimension to a polar moment of a cross section at the second maximum outer dimension is less than or equal to a ratio of the third maximum outer dimension to a polar moment of a cross section at the third maximum outer dimension multiplied by a percentage difference between a hardness of the first material and a hardness of the second material.

13. The tool bit of claim 9, wherein the second material has a hardness greater than a hardness of the first material.

14. The tool bit of claim 9, wherein the second segment is welded to the first segment at the connection interface.

15. A method of manufacturing a tool bit, the method comprising:

providing a first stock of material composed of a first material;

providing a second stock of material composed of a second material different than the first material;

fixing the first stock of material and the second stock of material together to form a connection interface;

shaping the first stock of material to form a first segment of a working end portion; and shaping the second stock of material to form a second segment of the working end portion, the second segment including a first portion that is fixed to the first stock of material and a second portion extending from the first portion to a tip, the second portion being the only portion of the tool bit configured to engage a fastener when the tool bit drives the fastener, wherein the first portion defines a first maximum outer dimension at an interface with the second portion, wherein the connection interface defines a second maximum outer dimension, and wherein the first maximum outer dimension is larger than the second maximum outer dimension.

16. The method of claim 15, further comprising determining a location of the connection interface based on when a ratio of the second maximum outer dimension to a polar moment of a cross section at the second maximum outer dimension is less than or equal to a ratio of the first maximum outer dimension to a polar moment of a cross section at the first maximum outer dimension multiplied by a percentage difference between a hardness of the first material and a hardness of the second material.

17. The method of claim 16, further comprising adjusting the location of the connection interface based on a heat affect zone created by fixing the first stock of material and the second stock of material together.

18. The method of claim 15, wherein shaping the first stock also includes shaping the first stock of material to also includes a drive portion configured to be selectively coupled to a tool and a shank extending between the drive portion and the first segment of the working end portion.

19. The method of claim 18, wherein the shank to includes a reduced diameter portion that allows the tool bit to twist along a length of the tool bit.

20. The method of claim 15, wherein fixing the first stock of material and the second stock of material includes welding the first stock of material to the second stock of material.

* * * * *